(12) United States Patent
Ghatak et al.

(10) Patent No.: US 10,880,377 B2
(45) Date of Patent: Dec. 29, 2020

(54) METHODS AND SYSTEMS FOR PRIORITIZING EVENTS ASSOCIATED WITH RESOURCES OF A NETWORKED STORAGE SYSTEM

(71) Applicant: NETAPP, INC., Sunnyvale, CA (US)

(72) Inventors: Kausik Ghatak, Bengaluru (IN); Sandeep Vasanth Kamath, Bengaluru (IN); Manoj, Bengaluru (IN)

(73) Assignee: NETAPP, INC., Sunnyvale, CA (US)

( * ) Notice: Subject to any disclaimer, the term of this patent is extended or adjusted under 35 U.S.C. 154(b) by 0 days.

(21) Appl. No.: 16/376,875

(22) Filed: Apr. 5, 2019

(65) Prior Publication Data

US 2020/0322432 A1    Oct. 8, 2020

(51) Int. Cl.
*H04L 29/08* (2006.01)
*H04L 12/911* (2013.01)
*G06N 20/00* (2019.01)

(52) U.S. Cl.
CPC ......... *H04L 67/1097* (2013.01); *G06N 20/00* (2019.01); *H04L 47/821* (2013.01)

(58) Field of Classification Search
CPC ........ G06F 13/00; H04L 12/911; H04L 29/06; H04L 29/08; H04L 29/08072;
(Continued)

(56) References Cited

U.S. PATENT DOCUMENTS 9,417,949 B1    8/2016   Bray et al.
9,652,316 B2    5/2017   Gamage et al.
(Continued)

FOREIGN PATENT DOCUMENTS

CN     107453906    12/2017
WO    WO2018004810   1/2018

OTHER PUBLICATIONS

Teixeira et al.; "HOLMES: An event-driven solution to monitor data centers through continuous queries and machine learning"; DEBS'10 Proceedings of the Fourth ACM International Conference on Distributed Event-Based Systems; Cambridge, United Kingdom; Jul. 12-15, 2010; pp. 216-221.
(Continued)

*Primary Examiner* — Robert B Harrell
(74) *Attorney, Agent, or Firm* — Klein, O'Neill & Singh, LLP

(57) ABSTRACT

Methods and systems for a networked storage system are provided. One method includes utilizing a training dataset for prioritizing a plurality of events associated with a networked storage system using a plurality of resources. Each event is associated with a plurality of parameters, each parameter associated with a severity level determination for each event; and each event is provided an initial priority score based on a time when each event is selected for resolution. The plurality of parameters may include an event source. The method further includes using the training dataset to identify a weight of each parameter by executing an iterative prediction algorithm; determining a priority score of a new event based on the weight of each parameter; updating the training dataset with the priority score of the new event; and adjusting a resource impacted by the new event, based on the priority score of the new event.

21 Claims, 8 Drawing Sheets

(58) Field of Classification Search
CPC ..... H04L 41/12; H04L 41/22; H04L 41/0213; H04L 47/821; H04L 67/00; H04L 67/1097; G06N 20/00
USPC .......................................................... 709/223
See application file for complete search history.

(56) References Cited

U.S. PATENT DOCUMENTS

| | | | |
|---|---|---|---|
| 10,038,618 B2 | 7/2018 | Bell et al. | |
| 2016/0315822 A1 | 10/2016 | Anderson et al. | |
| 2017/0322806 A1 | 11/2017 | Malur et al. | |
| 2018/0054363 A1 | 2/2018 | Ngampornsukswadi et al. | |
| 2018/0239658 A1 | 8/2018 | Whitner et al. | |
| 2018/0278477 A1 | 9/2018 | Auvenshine et al. | |
| 2018/0307561 A1* | 10/2018 | Iljazi | G06F 3/064 |
| 2019/0155691 A1* | 5/2019 | Khadiwala | G06F 3/0635 |
| 2019/0394273 A1* | 12/2019 | Basak | G06F 3/067 |

OTHER PUBLICATIONS

Solmaz et al.; "ALACA: A platform for dynamic alarm collection and alert notification in network management systems"; Wiley; John Wiley & Sons, Ltd; *Int J Network Mgmt.* 2017; 27:e1980; https://doi.org/10.1002/nem.1980.

Meng et al.; "An Effective High Threating Alarm Mining Method for Cloud Security Management"; IEEE Access; vol. 6, 2018; pp. 22634-22644.

Zhao et al.; "Classification and Visualization of Alarm Data Based on Heterogeneous Distance"; International Jounal of Data Warehousing and Mining; vol. 14, Issue 2, Apr.-Jun. 2018; Beijing, China; pp. 60-80.

* cited by examiner

| | | | Predictors 188 | | | | Response Variable |
|---|---|---|---|---|---|---|---|
| Source | Static Severity | Impact Area | No. of Cluster | No. of SVM | No. of Aggr | No. of Volm | Priority Score |
| QTree | CRITICAL | CAPACITY | 9 | 41 | 133 | 5710 | 100 |
| ManagementStation | ERROR | CONFIGURATION | 9 | 41 | 133 | 5710 | 67 |
| QTree | WARNING | CAPACITY | 9 | 41 | 133 | 5710 | 34 |
| Aggregate | WARNING | AVAILABILITY | 9 | 41 | 133 | 5710 | 100 |
| ClusterNode | ERROR | AVAILABILITY | 9 | 41 | 133 | 5710 | 88 |
| SnapMirrorRelationship | WARNING | PROTECTION | 9 | 41 | 133 | 5710 | 76 |
| Cluster | CRITICAL | AVAILABILITY | 9 | 41 | 133 | 5710 | 64 |

FIG. 1E

METHODS AND SYSTEMS FOR PRIORITIZING EVENTS ASSOCIATED WITH RESOURCES OF A NETWORKED STORAGE SYSTEM

TECHNICAL FIELD

The present disclosure relates to networked systems, and more particularly, to computing technology for managing events associated with operating networked systems.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices.

Networked storage systems (for example, storage systems used in a data center) are typically monitored by one or more computing devices. The storage systems provide event information to the computing device. The event information may be indicative of existing or potential problems within the datacenter. For example an event may indicate that a storage device is being over-utilized or underutilized, a storage controller or a component is unavailable, or any other incident/potential issue involved with operating one or more resources of the networked storage system.

Typically, events in data centers are generated based on static rules to reflect potential or actual issues. For example, events are typically associated with pre-programmed, statically determined "severity" levels, which determine the priority for resolving any issues indicated by the events. For a manual resolution process, a storage administrator typically first attends to events with higher static severity levels. For an automated integrated ticketing system, where a ticket is generated to resolve events, the static severity levels are translated to programmed severity levels for the ticketing system to generate a ticket. Similar to the manual process, the tickets are attended to, based on the static severity levels. Thus, the effort (manual or automated) in handling events in datacenters is influenced by the static severity levels associated with each reported event. However, the use of static severity levels has many flaws, for example, e.g. a critical/major performance event may be of less importance compared to a minor availability event during holiday seasons. A finance or transactional data intensive datacenter may perceive protection events more severe than "availability" events, whereas many web-based general purpose applications may emphasize availability. Furthermore, multiple events with same severity levels from different storage elements/different categories may overwhelm storage administrators. Therefore, the event resolution approach based solely on static severity levels is rigid and does not adapt to different operating environments. Continuous efforts are being made to develop computing technology for efficiently handling events associated with networked systems.

BRIEF DESCRIPTION OF THE DRAWINGS

The foregoing features and other features will now be described with reference to the drawings of the various aspects. In the drawings, the same components have the same reference numerals. The illustrated aspects are intended to illustrate, but not to limit the present disclosure. The drawings include the following Figures:

FIG. 1E shows an example of using the system of FIG. 1B, according to one aspect of the present disclosure;

DETAILED DESCRIPTION

As preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device type, in accordance with the claimed subject matter.

Figure 1A:
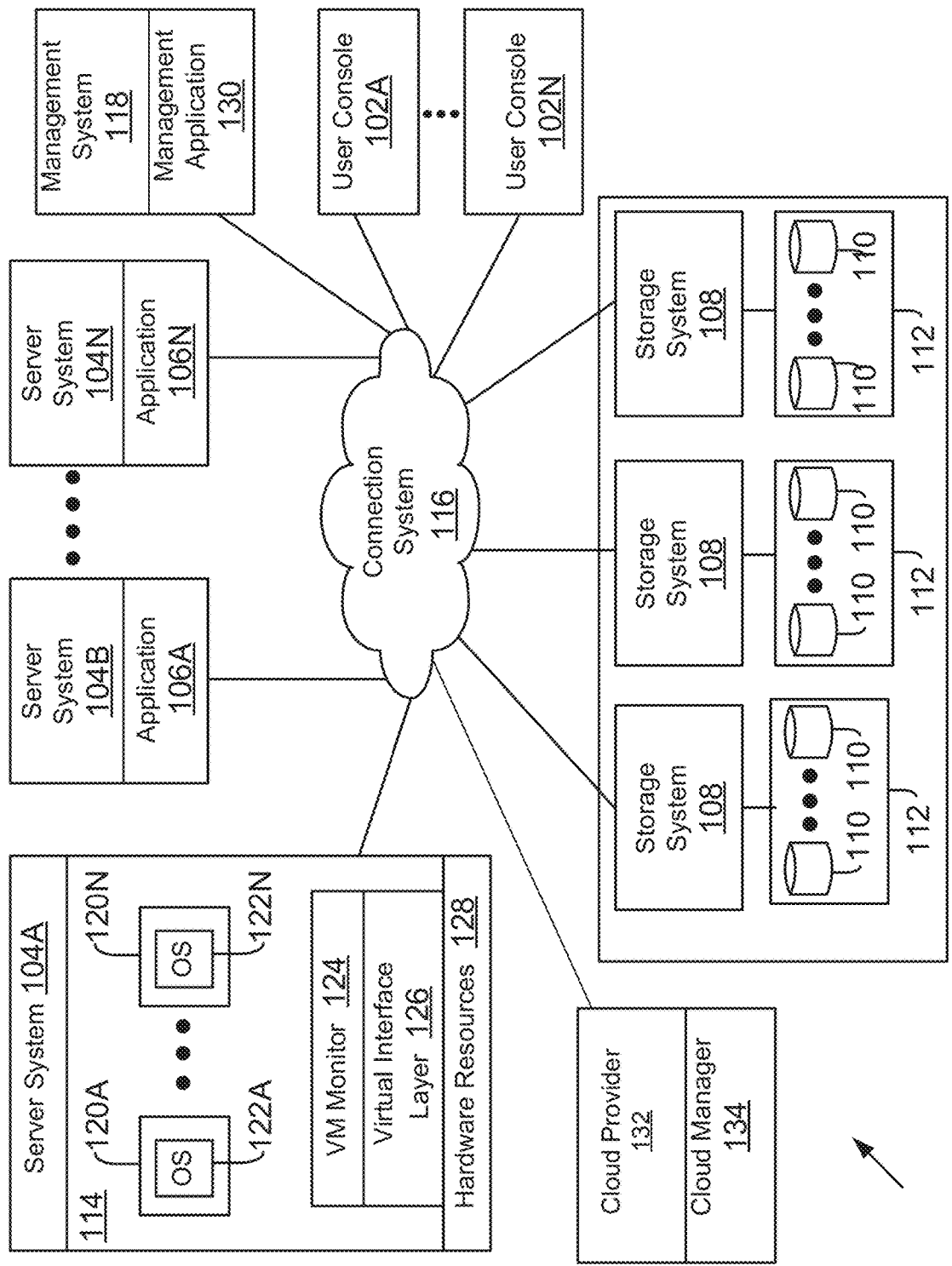
FIG. 1A shows an example of an operating environment for implementing the various aspects of the present disclosure.

System 100: FIG. 1A shows an example of a networked operating environment 100 (also referred to as system 100), for implementing the various adaptive aspects of the present disclosure. System 100 includes various hardware and software components, as described below. When an incident/event occurs, associated with any software/hardware component, then information regarding the event is generated and provided to a management system 118. The event data is parsed and evaluated to generate a priority score for resolving the event, as described below in detail.

In one aspect, system 100 may include a plurality of computing systems 104A-104N (may also be referred to and shown as server system (or server systems) 104 or as host system (or host systems) 104) that may access one or more storage systems 108 via a connection system 116 such as a local area network (LAN), wide area network (WAN), the Internet and others. The server systems 104 may communicate with each other via connection system 116, for example, for working collectively to provide data-access service to user consoles (or computing devices) 102A-102N (may be referred to as user 102 or client system 102).

A cloud provider 132 may be used to provide storage and storage related services (e.g. backup restore, cloning and other services) to clients. The cloud provider 132 may execute a cloud manager 134 for presenting storage and storage services associated with storage system 108. It is noteworthy that the cloud manager 134 may be a software layer executed by server systems 104 or any other computing device.

Server systems 104 may be computing devices configured to execute applications 106A-106N (may be referred to as application 106 or applications 106) over a variety of operating systems, including the UNIX® and MICROSOFT® WINDOWS® (without derogation of any third-party trademark rights) operating systems. Applications 106 may utilize data services of storage system 108 to access, store, and manage data in a set of storage devices 110 that are described below in detail. Applications 106 may include a database program, an email program or any other computer executable program.

Server systems 104 generally utilize file-based access protocols when accessing information (in the form of files and directories) over a network attached storage (NAS)-based network. Alternatively, server systems 104 may use block-based access protocols, for example, the Small Computer Systems Interface (SCSI) protocol encapsulated over TCP (iSCSI) and SCSI encapsulated over Fibre Channel (FCP) to access storage via a storage area network (SAN).

Server 104A executes a virtual machine environment 114, according to one aspect. In the virtual machine environment 114, a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software". In addition, resources available within the VM may be referred to herein as "guest resources".

The guest software expects to operate as if it were running on a dedicated computer rather than in a VM. That is, the guest software expects to control various events and have access to hardware resources on a physical computing system (may also be referred to as a host platform) which may be referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

The virtual machine environment 114 includes a plurality of VMs 120A-120N that execute a plurality of guest OS 122A-122N (may also be referred to as guest OS 122) to share hardware resources 128. As described above, hardware resources 128 may include CPU, memory, I/O devices, storage or any other hardware resource.

A virtual machine monitor (VMM) 124, for example, a processor executed hypervisor layer provided by VMWARE® Inc., HYPER-V® layer provided by MICROSOFT® Corporation (without derogation of any third party trademark rights) or any other virtualization layer type, presents and manages the plurality of guest OS 122. VMM 124 may include or interface with a virtualization layer (VIL) 126 that provides one or more virtualized hardware resource 128 to each guest OS. For example, VIL 126 presents physical storage at storage devices 110 as virtual storage (for example, as a virtual hard drive (VHD)) to VMs 120A-120N. The VMs use the VHDs to store information at storage devices 110.

In one aspect, VMM 124 is executed by server system 104A with VMs 120A-120N. In another aspect, VMM 124 may be executed by a separate stand-alone computing system, often referred to as a hypervisor server or VMM server and VMs 120A-120N are presented via another computer system. It is noteworthy that various vendors provide virtualization environments, for example, VMWARE® Corporation, MICROSOFT® Corporation (without derogation of any third party trademark rights), and others. The generic virtualization environment described above with respect to FIG. 1A may be customized depending on the virtual environment provider.

System 100 may also include the management system 118 for managing and configuring various elements of system 100. Management system 118 may include one or more computing systems for retrieving storage system 108 performance/utilization data. Management system 118 may also execute or include a management application 130 that receives event related information from storage systems 108 or from other computing devices that monitor one or more resources of system 100. The events are prioritized and handled based on the systems and processes described below.

In one aspect, storage system 108 is a shared storage system having access to a set of mass storage devices 110 (may be referred to as storage devices 110) within a storage subsystem 112. As an example, storage devices 110 may be a part of a storage array within the storage sub-system 112. Storage devices 110 are used by the storage system 108 for storing information. The storage devices 110 may include writable storage device media such as magnetic disks, video tape, optical, DVD, magnetic tape, non-volatile memory devices for example, self-encrypting drives, flash memory devices and any other similar media adapted to store information. The storage devices 110 may be organized as one or more groups of Redundant Array of Independent (or Inexpensive) Disks (RAID). The various aspects disclosed herein are not limited to any particular storage device or storage device configuration.

In one aspect, to facilitate access to storage devices 110, a storage operating system of storage system 108 "virtualizes" the storage space provided by storage devices 110. The storage system 108 can present or export data stored at storage devices 110 to server systems 104 and VMM 124 as a storage volume or one or more qtree sub-volume units including logical unit numbers (LUNs). Each storage volume may be configured to store data files (or data containers or data objects), scripts, word processing documents, executable programs, and any other type of structured or unstructured data. From the perspective of the VMS/server systems, each volume can appear to be a single disk drive.

However, each volume can represent the storage space in one disk, an aggregate of some or all of the storage space in multiple disks, a RAID group, or any other suitable set of storage space.

It is noteworthy that the term "disk" as used herein is intended to mean any storage device/space and not to limit the adaptive aspects to any particular type of storage device, for example, hard disks.

The storage system 108 may be used to store and manage information at storage devices 110 based on a request generated by server system 104, management system 118, user 102 and/or a VM. The request may be based on file-based access protocols, for example, the CIFS (Common Internet File System) or the NFS (Network File System) protocol, over TCP/IP. Alternatively, the request may use block-based access protocols, for example, iSCSI or FCP.

As an example, in a typical mode of operation, server system 104 (or VMs 120A-120N) transmits one or more input/output (I/O) commands, such as an NFS or CIFS request, over connection system 116 to the storage system 108. Storage system 108 receives the request, issues one or more I/O commands to storage devices 110 to read or write the data on behalf of the server system 104, and issues an NFS or CIFS response containing the requested data over the connection system 116 to the respective server system 104.

The storage system 108 maintains a plurality of counters (not shown) to track various performance parameters. For example, the storage system 108 tracks latency for processing input/output (I/O) requests for clients for each storage volume. The storage system 108 may also track the number TOPS (Input/Output Operations Per Second) for each volume, the storage capacity that is used for each volume and any rate of change of storage capacity utilization. The performance data maintained by the storage system 108 is provided to the management application 130.

In one aspect, storage system 108 may have a distributed architecture, for example, a cluster based system that may include a separate network module and storage module, described below in detail with respect to FIG. 2A. Briefly, the network module is used to communicate with server systems 104 and management system 118, while the storage module is used to communicate with the storage devices 110.

Figure 1B:
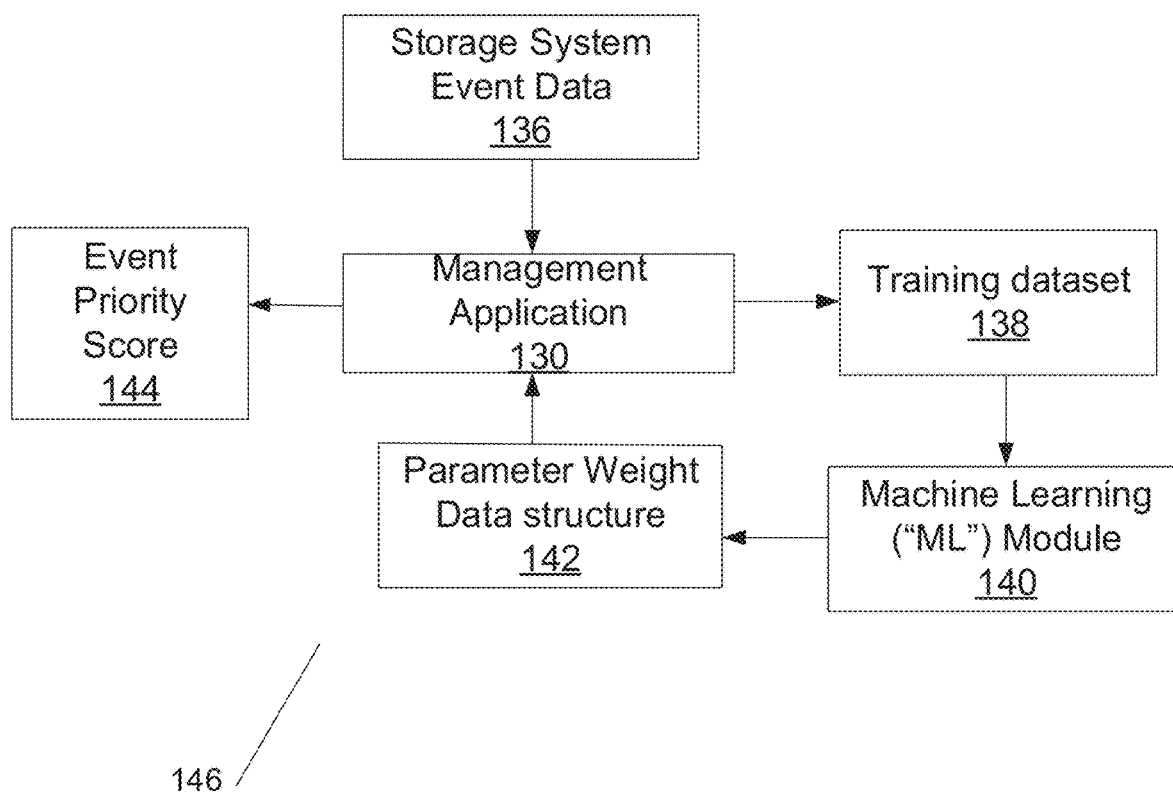
FIG. 1B shows an example of a system for processing events in the system of FIG. 1A, according to one aspect of the present disclosure.

FIG. 1B shows a block diagram of system 146 that is used to handle events reported by the components used in system 100, including storage systems 108. In one aspect, different parameters are programmed for storage system 108 that may indicate an event. For example, if storage capacity reaches a certain level then an event may be declared. If a storage system becomes unavailable, an event may be declared. If a backup or a data protection relationship becomes corrupt, then an event may be declared. If the configuration of a hardware or software component changes and the change is unacceptable, an event may be declared. If the latency for processing read and write requests reaches a threshold level, an event may be declared. The various events may have an associated, pre-programmed static severity level, for example, the level may be critical, the level may simply be a warning, or may indicate an error. Collectively, the storage system event information may be received as event data 136 by management application 130. The event data may indicate a source of the event (parameter P1), the static severity level (parameter P2), an impact area (or segment) (parameter P3), for example, capacity, configuration, availability, and data protection. The event data may also indicate a number of clusters (parameter P4) that are associated with an event, a number storage virtual machines (SVMs) (parameter P5) (described below in detail), a number of aggregates (parameter P5), and a number of storage volumes (parameter P7) that are associated with the event. It is noteworthy that these parameters are non-limiting examples and different parameters may be used based on an operating environment.

The management application 130 extracts event data 136 from clients using the storage systems 108. This data may be available via one or more platforms. For example, this data may be retrieved from AUTOSUPPORT® or ACTIVEIQ™, a hardware/software platform provided by NETAPP® Inc., the assignee of this application (without derogation of any trademark rights). AUTOSUPPORT® provides a mechanism that proactively monitors the health of storage systems and automatically sends messages to a technical support team that assists in handling any issues related to the messages.

To develop a training dataset 138, the management application 130 assigns an initial rank to each received event based on a time when the event was selected for resolution. The initial rank is then transformed to a score between 1-100. Each parameter, P1-P7 is assigned an initial value.

The training dataset 138 is then input to a machine learning (ML) module 140. The ML module 140 includes software instructions and code to execute an iterative predictive algorithm, for example, Random Forrest, Principal Component Analysis (PCA) Regression, GAM (General additive Model), Deep NeuralNetworks, Recurrent Neural Networks, Long Short-term memory ("LSTM") Networks or any other technique. The ML module 142 overtime provides weights for each parameter that may be stored at a data structure 142. The machine learned weights are used to determine the priority score of new events (shown as 144). The training dataset 138 is updated periodically so that the parameter weights reflect the latest operating environment.

In one aspect, instead of only relying on a static severity level, the methods and systems of the present disclosure use an intelligent, event priority score for selecting and processing events using at least the plurality of parameters mentioned above. The weight of the parameters is updated overtime. The priority score is used to implement corrective action for resolving events.

In one aspect, the corrective action is automated. The type of corrective action will depend on the type of event, and may include a software/hardware upgrade/update, a configuration change, re-location of a workload, provisioning or re-provisioning a storage volume or any other action executed by a computing device with minimal user intervention.

Figure 1C:
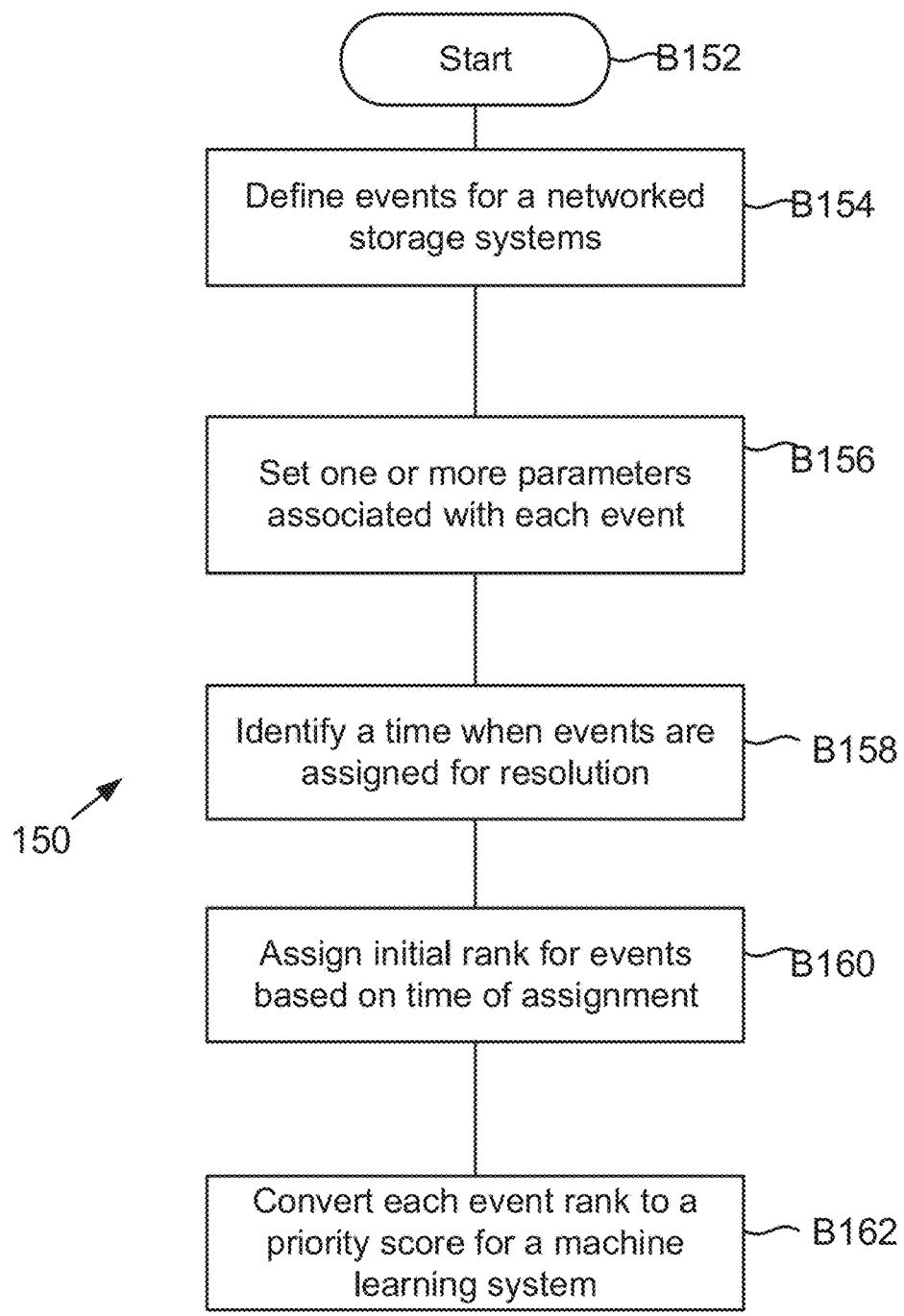
FIG. 1C shows a process for developing a training data set for the system of FIG. 1B, according to one aspect of the present disclosure.

Process Flows: FIG. 1C shows a process 150, according to one aspect of the present disclosure. Process 150 begins in block B152, when a storage system 108 has been installed and initialized. In block B154, events are defined for one or more storage systems. The events may be related to utilization of storage devices, latency in processing I/O requests, network bandwidth usage, or any other aspect involved in using the storage system 108.

In block B156, a plurality of parameters are defined based on which a severity of an event can be determined. It is noteworthy that the plurality of parameters may include a static severity level that is pre-programmed. The adaptive aspects described herein are not limited to any specific parameter for defining the severity or the severity level being pre-programmed. Furthermore, blocks B154 and B156 may be pre-deployment process steps that are executed before a system is deployed.

In block B158, the management application 130 extracts a "time" from event data 136. The time indicates when the event was selected for resolution. The event data 136 in this instance may be historical event data that has been collected by the management system 118 over time.

In block B160, an initial rank is assigned to each event from the event data 136. The initial rank is based on the time each event was selected for resolution.

In block B162, each event rank is converted into an initial priority score for the ML module 140. The initial score and the event data is then processed by the ML module 140 using an iterative prediction algorithm, as described below in detail.

Figure 1D:
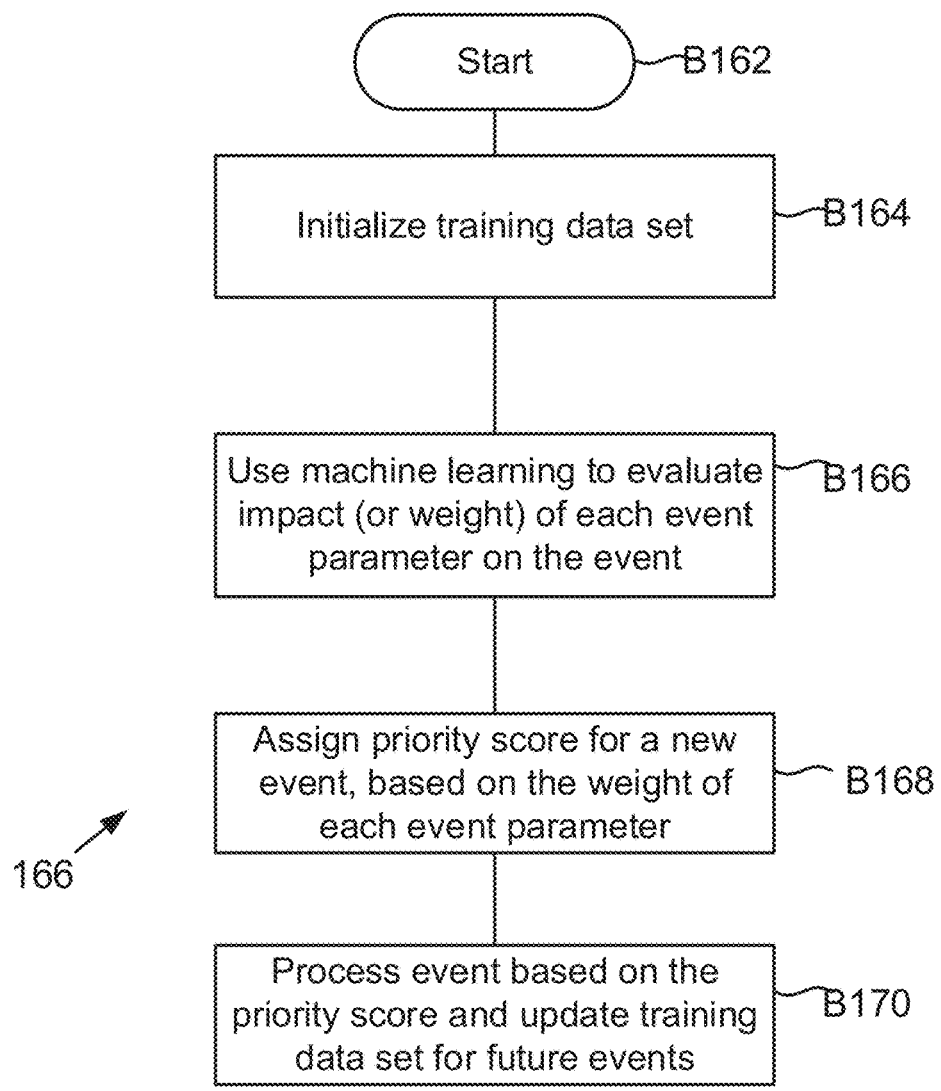
FIG. 1D shows a process for handling events in a networked system, according to one aspect of the present disclosure.

FIG. 1D shows a process 166, according to one aspect of the present disclosure. The process begins B162, when an initial training dataset 138 has been developed. The training dataset 138 is initialized in block B164. In block B166, the training dataset 138 is processed by the ML module 140. The ML module 140 using historical event data provides a weight for each parameter P1-Pn. The weight indicates the impact of the parameter on event severity. Based on the weight, a priority score for each event is determined in block B168.

When a new event is received, the weight determined by the ML module 140 is used to determine a priority score for the new event, in block B170. The priority score is used to resolve the event by initiating a corrective action. The priority score is also used to update the training dataset 138 for future events. In one aspect, the historically processed event data is used to predict the accuracy of the ML module 140 for the new event. The accuracy may be checked by using, e.g. Spearman's rank correlation coefficient.

FIG. 1E shows an example of using the methods and systems described above with respect to FIGS. 1B-1D. As shown in FIG. 1E, a plurality of parameters (or predictors 188) are used to determine the priority score shown in segment 186 for different events. The plurality of predictors include a source 172, a static severity level 174, an impact area 176, a number of clusters 178, a number of storage virtual machines (SVMs) 180, a number of aggregates 182, and a number of volumes 184.

As an example, the source 172 may be a qtree, a management station, an aggregate, a cluster node, a snapmirror relationship or any other source.

As an example, the severity level 174 may be defined as "critical", "warning", an "error" or any other denomination. The impact area 176 provides a segment of the networked storage system that is impacted by the event, for example, capacity, configuration, availability, protection or any other segment.

The number of clusters 178 provides the number of clusters that are associated with an event. The number of SVMs 180 provides the number of SVMs that are associated with an event. The number of aggregates 182 provides the number of aggregates that are associated with an event. The number of volumes 184 provides the number of volumes that are associated with an event. It is noteworthy that the adaptive aspects of the present disclosure are not limited to any specific set of parameters. Different parameters may be selected for different operating environments. The parameters may also change over time as the training datasets become more accurate.

In one aspect, methods and systems for a networked storage system are provided. One method includes utilizing a training dataset for prioritizing a plurality of events of a networked storage system using a plurality of resources. Each event is associated with a plurality of parameters that impact a severity level determination for each event; and each event is provided an initial priority score based on a time when each event is selected for resolution. The plurality of parameters include an event source. The method further includes using the training dataset to identify a weight of each parameter by executing an iterative prediction algorithm; determining a priority score of a new event based on the weight of each parameter; updating the training dataset using the priority score of the new event; and adjusting a resource impacted by the new event, based on the priority score.

In one aspect, the methods and systems described herein process events and initiate corrective action based on the importance of the various parameters. The importance of the parameters is determined by machine learning and can be customized for different operating environments. This technology provides an efficient way to manage and run data centers having various storage and networking resources.

Furthermore, the technology disclosed herein learns specifics of different operating environments by adjusting parameter weights, and predicts based on the needs of each of the different operating environments.

Clustered Storage System: FIG. 2A depicts an illustrative aspect of a shared, storage environment 200 using the management system 118 and the ML module 140 (not shown in FIG. 2A). The shared, storage environment 200 includes the management system 118, the cloud provider 132, a plurality of server systems 204.1-204.2 (similar to server systems 104), a clustered storage system 202 and at least one computer network 206 communicably connecting the server systems 204.1-204.2 and the clustered storage system 202.

The clustered storage system 202 includes a plurality of nodes 208.1-208.3, a cluster switching fabric 210, and a plurality of mass storage devices 212.1-212.3 (similar to 110, FIG. 1A). Each of the plurality of nodes 208.1-208.3 is configured to include a network module, a storage module, and a management module, each of which can be implemented as a separate processor executable or machine implemented module. Specifically, node 208.1 includes a network module 214.1, a storage module 216.1, and a management module 218.1, node 208.2 includes a network module 214.2, a storage module 216.2, and a management module 218.2, and node 208.3 includes a network module 214.3, a storage module 216.3, and a management module 218.3.

The network modules 214.1-214.3 include functionality that enables the respective nodes 208.1-208.3 to connect to one or more of the client systems 204.1-204.2 over the computer network 206, while the storage modules 216.1-216.3 connect to one or more of the storage devices 212.1-212.3.

The management modules 218.1-218.3 provide management functions for the clustered storage system 202. Accordingly, each of the plurality of server nodes 208.1-208.3 in the clustered storage server arrangement provides the functionality of a storage server.

A switched virtualization layer including a plurality of virtual interfaces (VIFs) 220 is provided below the interface between the respective network modules 214.1-214.3 and the client systems 204.1-204.2, allowing storage 212.1-212.3 associated with the nodes 208.1-208.3 to be presented to the client systems 204.1-204.2 as a single shared storage pool. For example, the switched virtualization layer may implement a virtual interface architecture. FIG. 2A depicts only the VIFs 220 at the interfaces to the network modules 214.1, 214.3 for clarity of illustration.

The clustered storage system 202 can be organized into any suitable number of virtual servers (VServer or storage virtual machines (SVM)) 222A-222N, in which each virtual storage system represents a single storage system namespace with separate network access. Each virtual storage system has a user domain and a security domain that are separate from the user and security domains of other virtual storage systems. Server systems 204 can access storage space via a VServer from any node of the clustered system 202.

Each of the nodes 208.1-208.3 may be defined as a computer adapted to provide application services to one or more of the client systems 204.1-204.2. In this context, a SVM is an instance of an application service provided to a client system. The nodes 208.1-208.3 are interconnected by the switching fabric 210, which, for example, may be embodied as a Gigabit Ethernet switch or any other switch type.

Figure 2A:
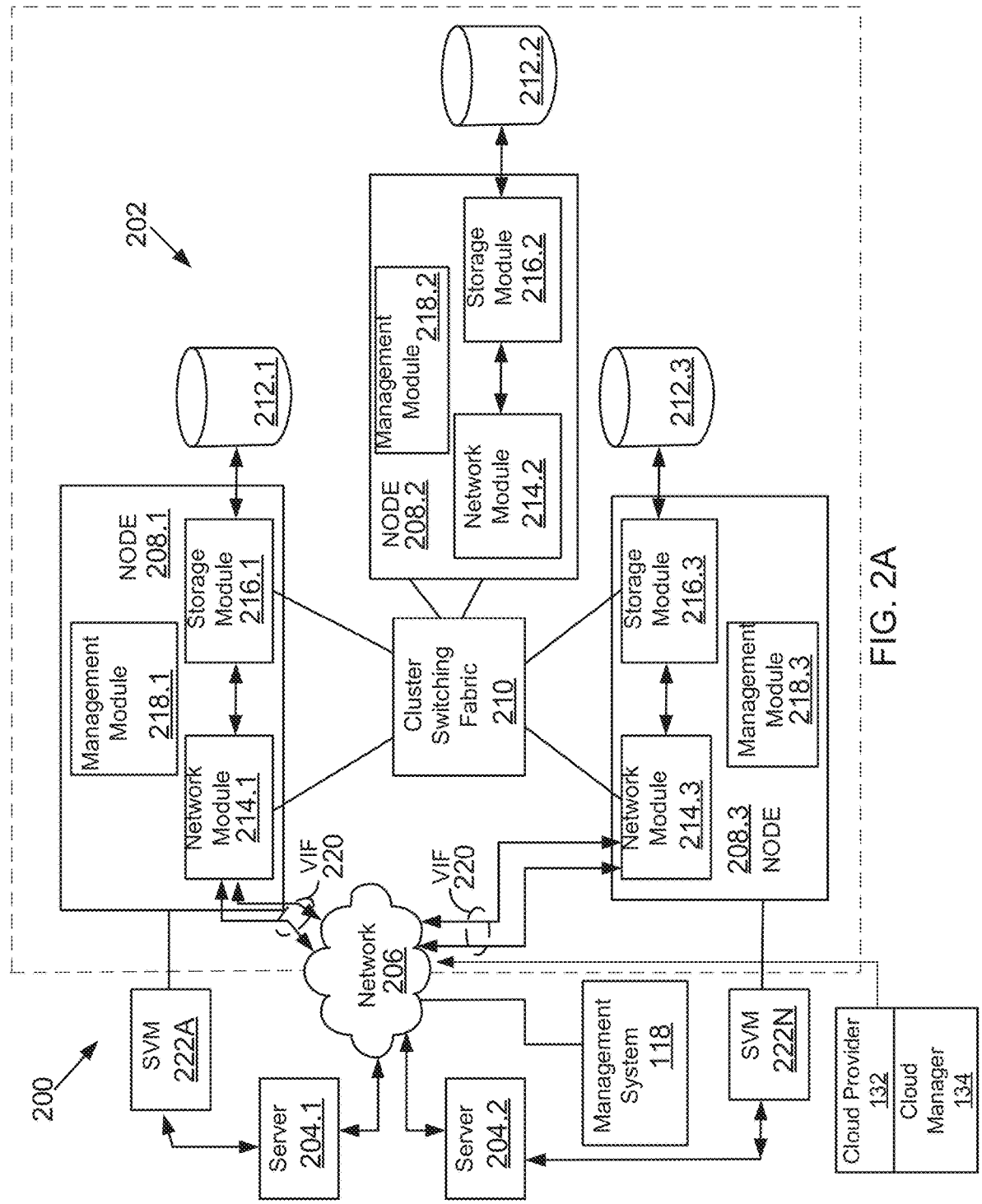
FIG. 2A shows an example of a clustered storage system, used according to one aspect of the present disclosure.

Although FIG. 2A depicts three network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules.

The server systems 204.1-204.2 of FIG. 2A may be implemented as computing devices configured to interact with the respective nodes 208.1-208.3 in accordance with a client/server model of information delivery. In the presently disclosed aspect, the interaction between the server systems 204.1-204.2 and the nodes 208.1-208.3 enable the provision of network data storage services. Specifically, each server system 204.1, 204.2 may request the services of one of the respective nodes 208.1, 208.2, 208.3, and that node may return the results of the services requested by the client system by exchanging packets over the computer network 206, which may be wire-based, optical fiber, wireless, or any other suitable combination thereof. The server systems 204.1-204.2 may issue packets according to file-based access protocols, such as the NFS or CIFS protocol, when accessing information in the form of files and directories.

In a typical mode of operation, one of the server systems 204.1-204.2 transmits an NFS or CIFS request for data to one of the nodes 208.1-208.3 within the clustered storage system 202, and the VIF 220 associated with the respective node receives the client request. It is noted that each VIF 220 within the clustered system 202 is a network endpoint having an associated IP address. The server request typically includes a file handle for a data file stored in a specified volume on at storage 212.1-212.3.

Figure 2B:
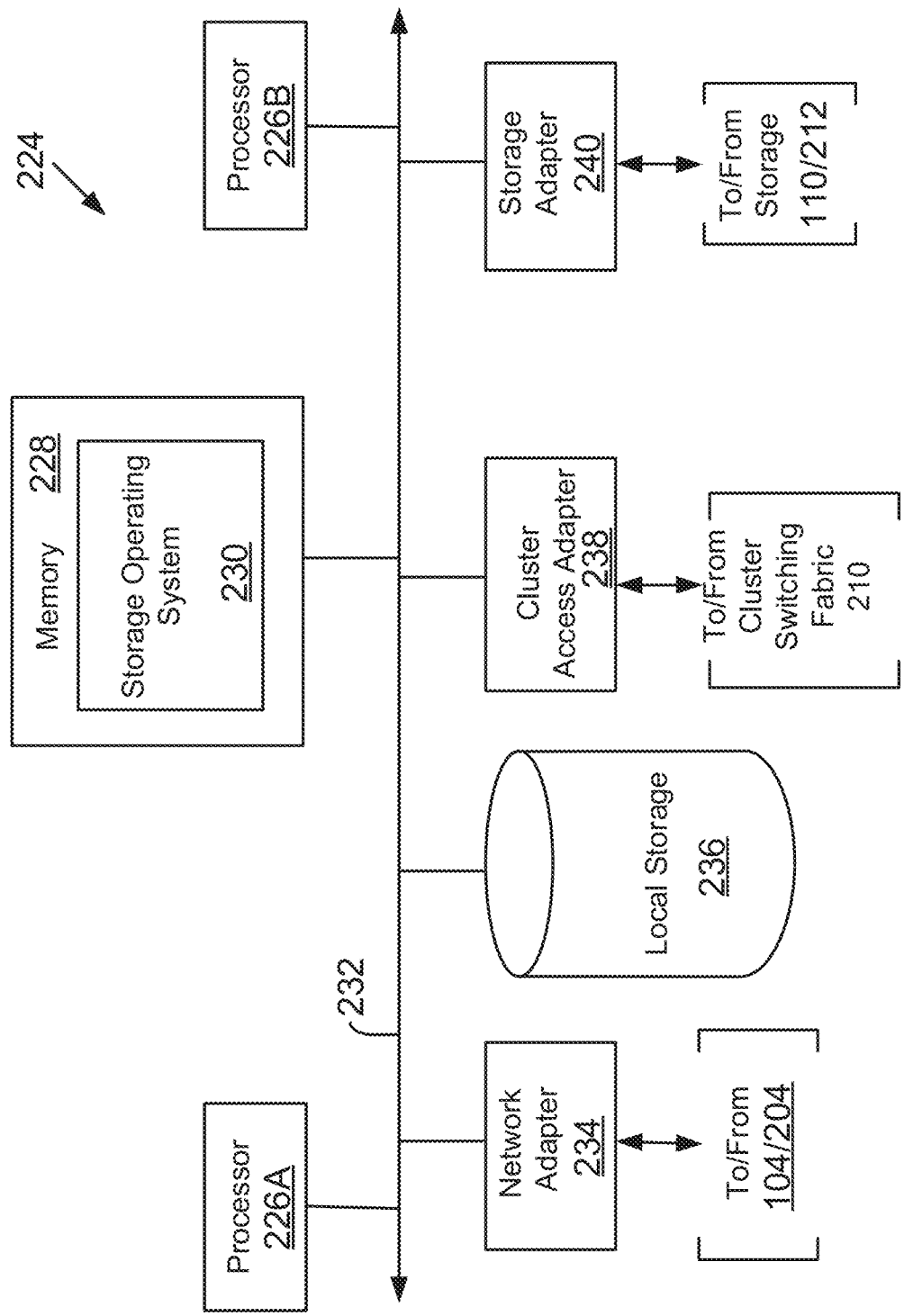
FIG. 2B shows an example of a storage system node, used according to one aspect of the present disclosure.

Storage System Node: FIG. 2B is a block diagram of a computing system 224, according to one aspect. System 224 may be used by a stand-alone storage system 108 and/or a storage system node operating within a cluster based storage system described above with respect to FIG. 2A.

System 224 may include a plurality of processors 226A and 226B, a memory 228, a network adapter 234, a cluster access adapter 238 (used for a cluster environment), a storage adapter 240 and local storage 236 interconnected by a system bus 232. The local storage 236 comprises one or more storage devices, such as disks, utilized by the processors to locally store configuration and other information.

The cluster access adapter 238 comprises a plurality of ports adapted to couple system 224 to other nodes of a cluster as described above with respect to FIG. 2A. In the illustrative aspect, Ethernet may be used as the clustering protocol and interconnect media, although it will be apparent to those skilled in the art that other types of protocols and interconnects may be utilized within the cluster architecture described herein.

System 224 is illustratively embodied as a dual processor storage system executing a storage operating system 230 that preferably implements a high-level module, such as a file system, to logically organize information as a hierarchical structure of named directories, files and special types of files called virtual disks (hereinafter generally "blocks") on storage devices 110/212. However, it will be apparent to those of ordinary skill in the art that the system 224 may alternatively comprise a single or more than two processor systems. Illustratively, one processor 226 executes the functions of a network module on a node, while the other processor 226B executes the functions of a storage module.

The memory 228 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions described herein.

The storage operating system 230, portions of which is typically resident in memory and executed by the processing elements, functionally organizes the system 224 by, inter alia, invoking storage operations in support of the storage service provided by storage system 108. An example of operating system 230 is the DATA ONTAP® (Registered trademark of NETAPP®, Inc. operating system available from NETAPP®, Inc. that implements a Write Anywhere File Layout (WAFL® (Registered trademark of NETAPP®, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

The network adapter 234 comprises a plurality of ports adapted to couple the system 224 to one or more server systems over point-to-point links, wide area networks, virtual private networks implemented over a public network (Internet) or a shared local area network. The network adapter 234 thus may comprise the mechanical, electrical and signaling circuitry needed to connect storage system 108 to the network. Illustratively, the computer network may be embodied as an Ethernet network or a FC network.

The storage adapter 240 cooperates with the storage operating system 230 executing on the system 224 to access information requested by the server systems 104 and management system 118 (FIG. 1A). The information may be stored on any type of attached array of writable storage device media such as video tape, optical, DVD, magnetic tape, bubble memory, electronic random access memory, flash memory devices, micro-electro mechanical and any other similar media adapted to store information, including data and parity information.

The storage adapter 240 comprises a plurality of ports having input/output (I/O) interface circuitry that couples to the disks over an I/O interconnect arrangement, such as a conventional high-performance, FC link topology.

In another aspect, instead of using a separate network and storage adapter, a converged adapter is used to process both network and storage traffic.

Figure 3:
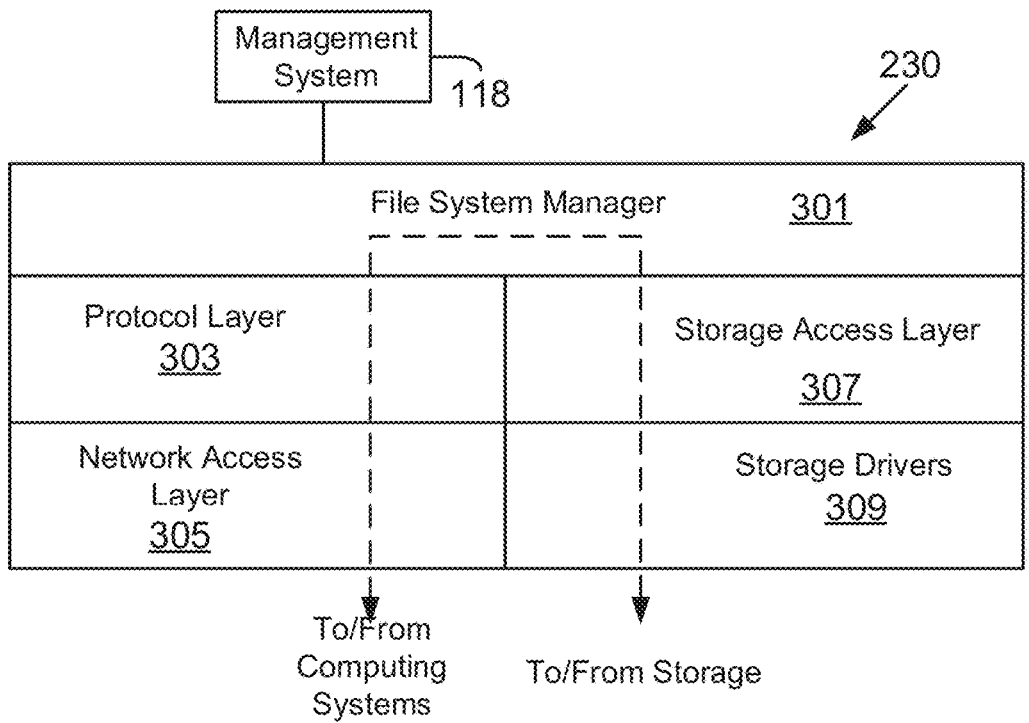
FIG. 3 shows an example of a storage operating system, used according to one aspect of the present disclosure.

Operating System: FIG. 3 illustrates a generic example of operating system 230 executed by storage system 108, according to one aspect of the present disclosure. Storage operating system 230 interfaces with the management system 118 for providing performance data that can be used for ranking events, described above in detail.

As an example, operating system 230 may include several modules, or "layers". These layers include a file system manager 303 that keeps track of a directory structure (hierarchy) of the data stored in storage devices and manages read/write operations, i.e. executes read/write operations on disks in response to server system 104 requests.

Operating system 230 may also include a protocol layer 303 and an associated network access layer 305, to allow system 200 to communicate over a network with other systems, such as server system 104 and management system 118. Protocol layer 303 may implement one or more of various higher-level network protocols, such as NFS, CIFS, Hypertext Transfer Protocol (HTTP), TCP/IP and others, as described below.

Network access layer 305 may include one or more drivers, which implement one or more lower-level protocols to communicate over the network, such as Ethernet. Interactions between server systems 104 and mass storage devices 110/212 are illustrated schematically as a path, which illustrates the flow of data through operating system 230.

The operating system 230 may also include a storage access layer 307 and an associated storage driver layer 309 to communicate with a storage device. The storage access layer 307 may implement a higher-level disk storage protocol, such as RAID (redundant array of inexpensive disks), while the storage driver layer 309 may implement a lower-level storage device access protocol, such as FC or SCSI.

It should be noted that the software "path" through the operating system layers described above needed to perform data storage access for a client request may alternatively be implemented in hardware. That is, in an alternate aspect of the disclosure, the storage access request data path may be implemented as logic circuitry embodied within a field programmable gate array (FPGA) or an ASIC. This type of hardware implementation increases the performance of the file service provided by storage system 108.

As used herein, the term "storage operating system" generally refers to the computer-executable code operable on a computer to perform a storage function that manages data access and may implement data access semantics of a general purpose operating system. The storage operating system can also be implemented as a microkernel, an application program operating over a general-purpose operating system, such as UNIX® or WINDOWS®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems.

Figure 4:
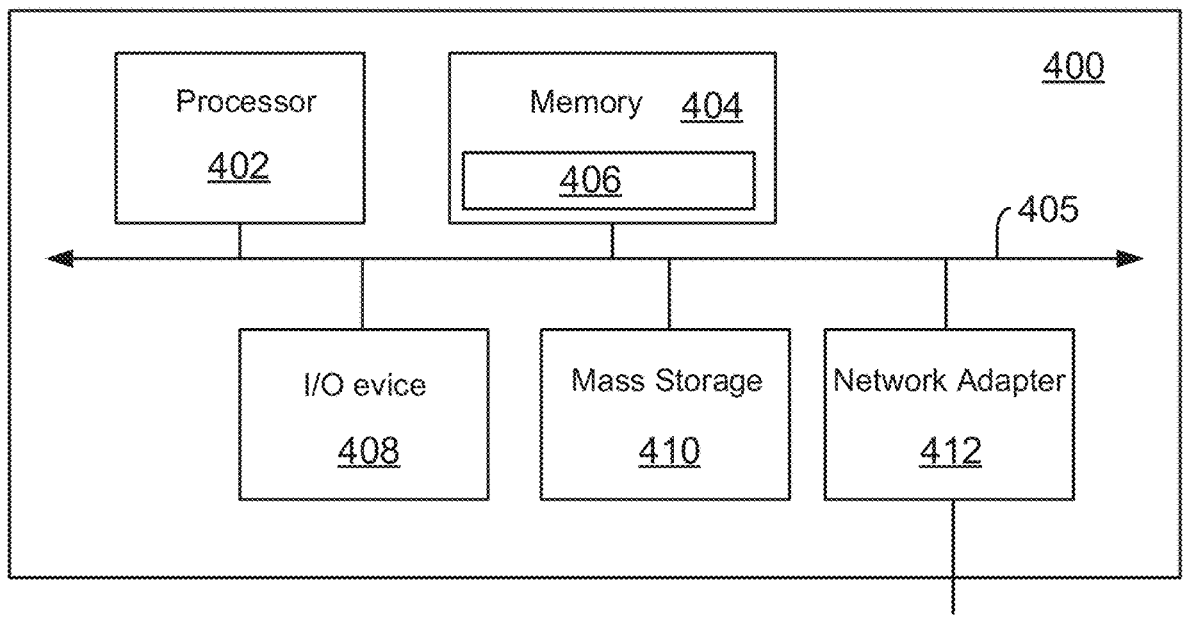
FIG. 4 shows an example of a processing system, used according to one aspect of the present disclosure.

Processing System: FIG. 4 is a high-level block diagram showing an example of the architecture of a processing system, at a high level, in which executable instructions as described above can be implemented. The processing system 400 can represent modules of management system 118, user console 102, server systems 104, cloud provider 132 and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain aspects, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random access memory (RAM), read-only memory (ROM), flash memory, or the like, or a combination of such devices. Memory 404 includes the main memory of the processing system 400. Instructions 406 which implements techniques introduced above may reside in and may be executed (by processors 402) from memory 404. For example, instructions 406 may include code used for executing the process blocks of FIGS. 1C and 1D.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

The system and techniques described herein are applicable and useful in the cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this disclosure, the application allows a client to access storage via a cloud.

After the application layer, is a cloud platform and cloud infrastructure, followed by a "server" layer that includes hardware and computer software designed for cloud specific services. Details regarding these layers are not germane to the inventive aspects.

Thus, methods and systems for handling events in data center have been described. Note that references throughout this specification to "one aspect" or "an aspect" mean that a particular feature, structure or characteristic described in connection with the aspect is included in at least one aspect of the present invention. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising;
utilizing, by a processor, a training dataset for prioritizing a plurality of events associated with a networked storage system, the networked storage system using a plurality of resources;
wherein each event is associated with a plurality of parameters that impact a severity level determination of each event, the plurality of parameters includes an event source;
wherein each event is provided an initial priority score, based on a time when each event is selected for resolution;
using, by the processor, the training dataset to identify a weight of each of the plurality of parameters by executing an iterative prediction algorithm;
determining, by the processor, a priority score of a new event, based on the weight of each of the plurality of parameters;
updating, by the processor, the training dataset with the priority score of the new event; and
adjusting a resource of the networked storage system impacted by the new event, based on the priority score of the new event.

2. The method of claim 1, wherein the plurality of parameters include a static severity level and an impact segment of the networked storage system.

3. The method of claim 1, wherein the plurality of parameters include a number of clusters in the networked storage system.

4. The method of claim 1, wherein the plurality of parameters include a number of storage volumes associated with each event.

5. The method of claim 1, wherein the plurality of parameters include a number of virtual storage machines presented by the networked storage system.

6. The method of claim 1, wherein the new event is related to utilization of storage capacity at the networked storage system.

7. The method of claim 1, wherein the new event is related to configuration of a resource of the networked storage system.

8. A non-transitory machine readable storage medium having stored thereon instructions for performing a method, comprising machine executable code which when executed by at least one machine, causes the machine to:
utilize a training dataset for prioritizing a plurality of events associated with a networked storage system, the networked storage system using a plurality of resources;
wherein each event is associated with a plurality of parameters that impact a severity level determination of each event, the plurality of parameters includes an event source;
wherein each event is provided an initial priority score, based on a time when each event is selected for resolution;
use the training dataset to identify a weight of each of the plurality of parameters by executing an iterative prediction algorithm;
determine a priority score of a new event, based on the weight of each of the plurality of parameters;
update the training dataset with the priority score of the new event; and
adjust a resource of the networked storage system impacted by the new event, based on the priority score of the new event.

9. The non-transitory storage medium of claim 8, wherein the plurality of parameters include a static severity level and an impact segment of the networked storage system.

10. The non-transitory storage medium of claim 8, wherein the plurality of parameters include a number of clusters in the networked storage system.

11. The non-transitory storage medium of claim 8, wherein the plurality of parameters include a number of storage volumes associated with each event.

12. The non-transitory storage medium of claim 8, wherein the plurality of parameters include a number of virtual storage machines presented by the networked storage system.

13. The non-transitory storage medium of claim 8, wherein the new event is related to utilization of storage capacity at the networked storage system.

14. The non-transitory storage medium of claim 8, wherein the new event is related to configuration of a resource of the networked storage system.

15. A system comprising:
a memory containing machine readable medium comprising machine executable code having stored thereon instructions; and a processor module coupled to the memory to execute the machine executable code to:

utilize a training dataset for prioritizing a plurality of events associated with a networked storage system, the networked storage system using a plurality of resources;

wherein each event is associated with a plurality of parameters that impact a severity level determination of each event, the plurality of parameters includes an event source;

wherein each event is provided an initial priority score, based on a time when each event is selected for resolution;

use the training dataset to identify a weight of each of the plurality of parameters by executing an iterative prediction algorithm;

determine a priority score of a new event, based on the weight of each of the plurality of parameters;

update the training dataset with the priority score of the new event; and adjust a resource of the networked storage system impacted by the new event, based on the priority score of the new event.

16. The system of claim 15, wherein the plurality of parameters include a static severity level and an impact segment of the networked storage system.

17. The system of claim 15, wherein the plurality of parameters include a number of clusters in the networked storage system.

18. The system of claim 15, wherein the plurality of parameters include a number of storage volumes associated with each event.

19. The system of claim 15, wherein the plurality of parameters include a number of virtual storage machines presented by the networked storage system.

20. The system of claim 15, wherein the new event is related to utilization of storage capacity at the networked storage system.

21. The system of claim 15, wherein the new event is related to configuration of a resource of the networked storage system.

* * * * *